United States Patent

[11] 3,625,843

| | | |
|---|---|---|
| [72] | Inventor | Heinz Doevenspeck<br>Minden, Germany |
| [21] | Appl. No. | 762,492 |
| [22] | Filed | Sept. 25, 1968 |
| [45] | Patented | Dec. 7, 1971 |
| [73] | Assignee | Dr. Richart Elfer<br>Wirtschaftsprufungsgesellschaft und<br>Steuerberatungsgesellschaft mit<br>beschrankter Haftung<br>Luisenstrasse, Dortmund, Germany |
| [32] | Priority | Sept. 26, 1967 |
| [33] | | Germany |
| [31] | | P 16 67 029.4 |

[54] METHOD FOR TREATING BEER
4 Claims, 8 Drawing Figs.

[52] U.S. Cl. .................................................. 204/139
[51] Int. Cl. ................................................... C12h 1/02,
B01k 1/06
[50] Field of Search .......................................... 204/130,
131, 137, 137.5, 139

[56] References Cited
UNITED STATES PATENTS

| | | | |
|---|---|---|---|
| 2,061,960 | 11/1936 | Coffman et al. ............... | 204/139 |
| 1,162,213 | 11/1915 | Bloom ........................... | 204/139 |
| 1,162,212 | 11/1915 | Bloom ........................... | 204/139 |
| 918,531 | 6/1909 | Goucher ........................ | 204/137 |
| 2,958,570 | 11/1960 | Fessler .......................... | 204/137.6 |
| 2,101,029 | 12/1937 | Koerber ........................ | 204/139 |

FOREIGN PATENTS

| | | | |
|---|---|---|---|
| 4,695 | 1897 | Great Britain ................ | 204/139 |
| 199,265 | 3/1907 | Germany ...................... | 204/139 |

*Primary Examiner*—John H. Mack
*Assistant Examiner*—R. L. Andrews
*Attorney*—Markva & Smith

ABSTRACT: The invention provides a method of and a device for treating disperse systems, preferably liquids, particularly beer, which device comprises at least one cascade container having an inlet and an outlet for the systems to be treated, a plurality of cascade barriers in the form of positive and negative carbon electrodes, and an induction coil connected to said cascade container on the upstream side of said inlet, said induction coil and said negative carbon electrodes being grounded in series.

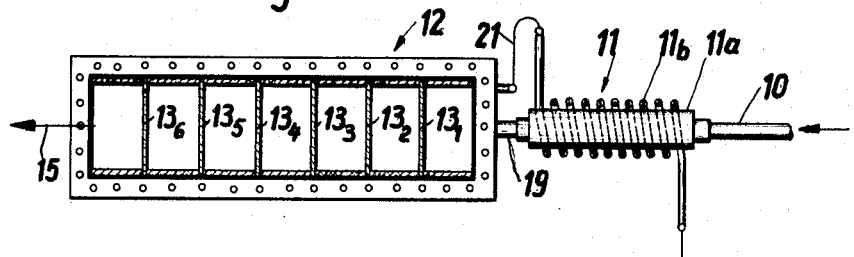
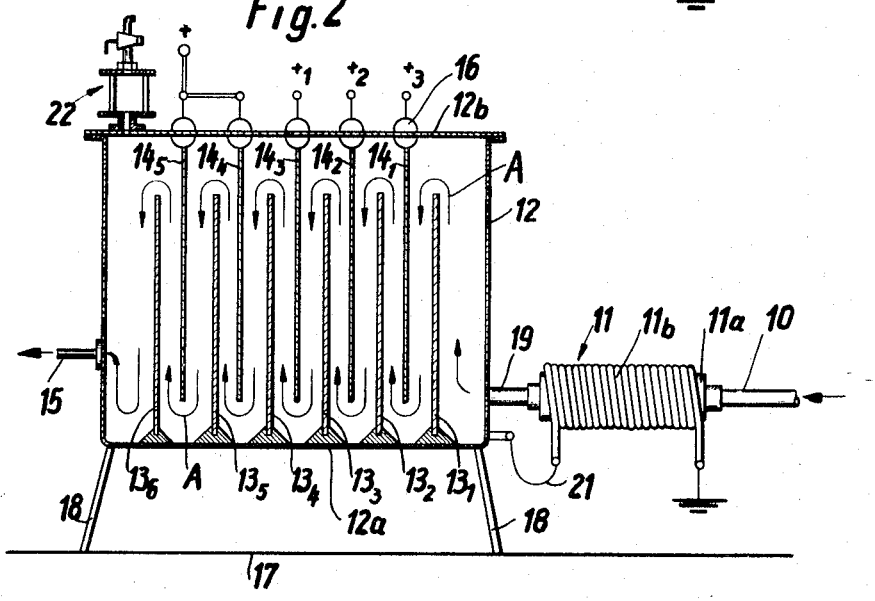
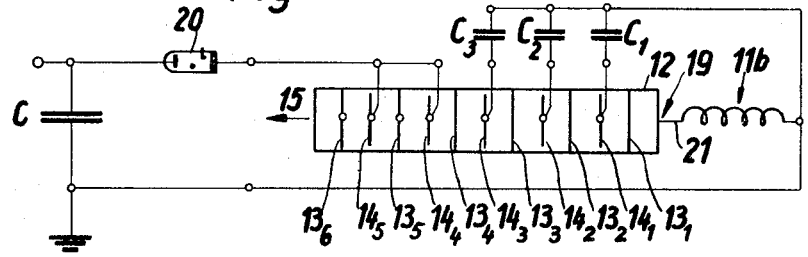

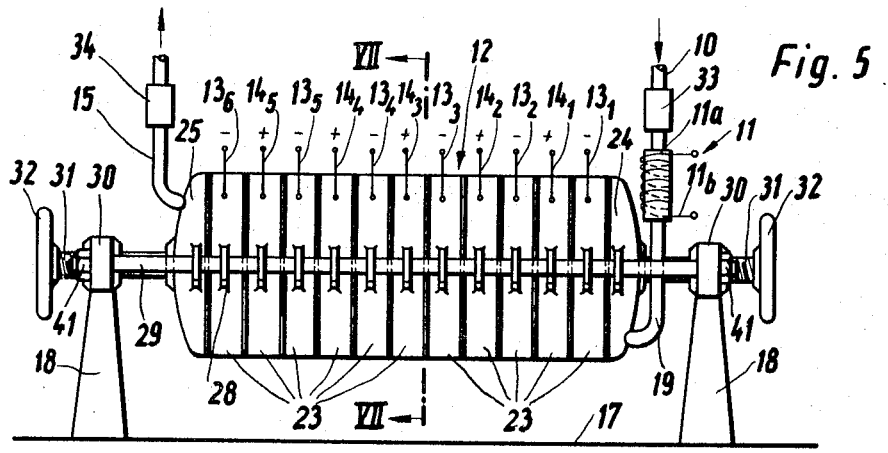
Fig. 5
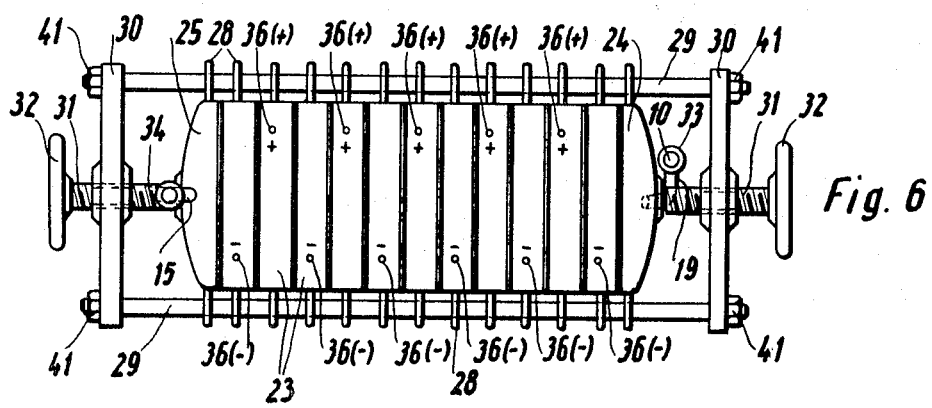
Fig. 6
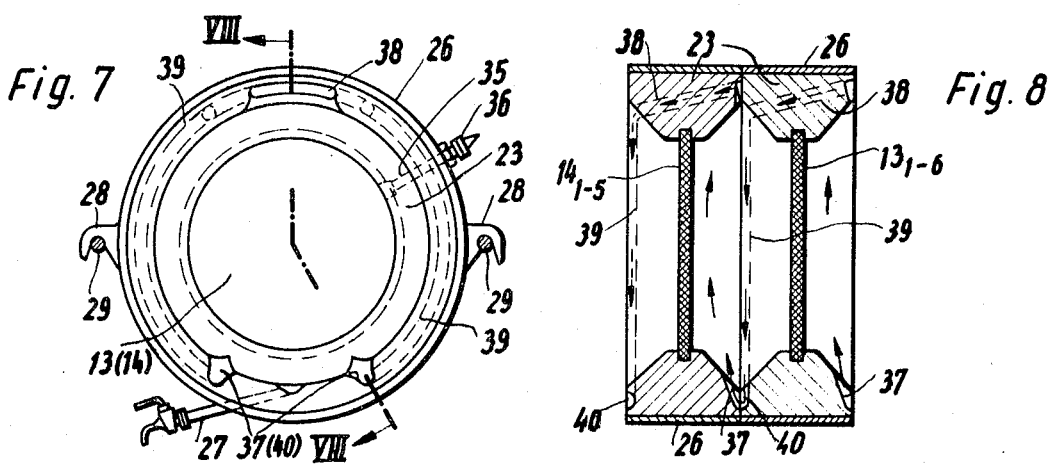
Fig. 7
Fig. 8
Inventor:
HEINZ DOEVENSPECK

METHOD FOR TREATING BEER

BACKGROUND OF THE INVENTION

This invention relates to a method of and a device for treating disperse systems, preferably liquids, particularly beer, by changing the electric charge on the systems in that the disperse systems to be treated are subjected to direct-current fields produced by high-potential capacitors and impulse discharged between carbon electrodes, with the disperse systems under treatment acting as an electrolyte.

The invention proceeds from a method described in German Pat. 1,237,541.

SUMMARY OF THE INVENTION

It is an object of the present invention to develop this prior art method and, in particular, to render it applicable with advantage to the treatment of liquids, preferably of beer. The method is intended to be developed in a manner as to enable the same to be carried out at temperatures of only about 25° C, thereby to prevent changes in flavor and color of the liquids to be treated and to obtain, at the same time, pasteurization and/or sterilization as well as stabilization of the liquids for the purpose of increasing the durability thereof.

To attain this object, the present invention proposes to subject the disperse systems to powerful electromagnetic pulses within at least one induction coil for changing additionally the electromagnetic charge on the disperse systems.

According to a further proposal of the invention the method is carried out in that the disperse systems are subjected first to the electromagnetic pulses and subsequently to impulse-discharged direct-current fields.

Another embodiment of the invention provides that the disperse systems are subjected to impulse-discharged direct-current fields of gradually increased voltage. In this context, by direct-current fields the displacement current originating from the discharge of capacitors is understood. The aforementioned features make it for the first time possible to treat disperse systems, especially liquids, and among these preferably beer, to the end of increasing the durability thereof without detriment to color and flavor. Getting turbid of the liquids, especially of beer, as well as subsequent turbidity thereof, are eliminated due to the fact that the instable protein compounds causing such turbidity precipitate after the treatment by the method of the present invention and thus can be separated by filtration or centrifugation, respectively. Another distinct advantage of this method consists in that the treatment of the liquids can be performed at very low temperatures and yet a high stability of the liquids is obtained by the inactivation of bacteria. At the same time, precipitation of the dispersoids dissolved in liquids such as beer is obtained, whereby subsequent turbidity is avoided with certainty. Thus, a colloid-chemical and bacteriological stabilization is effected accompanied by pasteurization and/or sterilization.

A further advantage of the method proposed by the present invention is the low energy consumption involved, since the process temperatures (25° C.) are extremely low in comparison with those of the known conventional methods (approx. 70° C., i.e. the temperature hitherto required for the pasteurization of beer and milk). The dispersoids precipitated by the method of the present invention can be eliminated from the product by filtration or centrifugation, respectively. The method also has the advantage that it makes superfluous the usual addition of chemicals for the stabilization of liquids such as beer.

Another object of the present invention is to provide a device for performing the aforedescribed method, which combines simple and cost-saving design with an optimum of efficiency.

The device provided by the present invention comprises at least one cascade container having an inlet and an outlet for the disperse systems to be treated, a plurality of cascade barriers in the form of positive and negative carbon electrodes, and an induction coil connected to said cascade container on the upstream side of said inlet, said induction coil and said negative carbon electrodes being grounded in series.

In an advantageous embodiment of the invention the device for treating disperse systems consists of a cascade container comprising a switch, preferably a gas discharge device, for connecting and disconnecting the positive carbon electrodes disposed next to said outlet of said cascade container in the direction of flow of the disperse systems to be treated, to, respectively from, a first or high-potential capacitor, the positive carbon electrodes disposed next to said inlet being grounded each through one of several second capacitors, and charging of said latter capacitors taking place through the disperse systems acting as electrolytes, out of the residual voltage from the preceding discharge of said first or high-potential capacitor.

The device of the present invention is simple in design and thus cost-saving. The device can readily be adapted to varying operational requirements by increasing or decreasing the number of cascades, which are provided as modular units, so that in each case an optimum of efficiency will be obtained. An important feature of the invention is that the high-potential capacitor charges are only applied to part of the positive carbon electrodes, the remaining positive carbon electrodes being each grounded through a capacitor so that in this region, too, there will be impulse discharges, but of a weaker nature and without requiring additional expenditure of energy.

In another advantageous embodiment of the invention, a device for treating disperse systems comprises a plurality of cascade containers connected in parallel and/or in series to form a cascade container assembly.

Developing this concept leads to an embodiment in which a device for treating disperse systems comprises a plurality of cascade container assemblies connected in parallel and/or in series.

The aforementioned features of the invention result in the advantage that the capacity and efficiency of the device can be increased, not only quantitatively but also qualitatively, and adapted to each special case so as to provide optimum conditions.

Conveniently, each cascade container maybe provided with a degassing valve located at the outlet end of said container and having an inspection window.

Such a degassing valve with inspection window, commonly known as "lantern" in the brewing art, enables gas bubbles, which may possible develop, to be detected visually and eliminated in a very simple manner.

In a further embodiment of the invention, a device for treating disperse systems comprises a cascade container formed by at least three similar annular and electrically nonconducting pressure elements having an inlet end cover and an outlet end cover, each of said pressure elements being provided with a cascade barrier serving as carbon electrode.

Expediently, the pressure elements are made from plastics material, preferably polyethylene, which is indifferent to foodstuffs and luxuries or stimulants. Furthermore, each pressure element may be externally armored with a steel hoop and provided with a sediment drain.

The aforedescribed features result in the advantage that any flashover of the electric charge to the walls of the cascade container is reliably prevented. This is achieved in that the pressure elements forming the cascade container are electrically nonconducting and thus exclude any flashover of the electric voltage applied. Structurally, these features enable the cascade container to be assembled from similar pressure elements which can be produced in large series and thus contribute to cost saving. Moreover, the pressure elements are interchangeable so that cascade containers of any size can be obtained by the unit construction system and, at the same time, storage of spare parts is simplified.

Due to the fact that the pressure elements are made from plastics material which is indifferent to foodstuffs and luxuries or stimulants, it is also possible that very delicate foodstuffs and stimulants, such as beer, can be treated satisfactorily.

By armoring the pressure elements with an external steel hoop both electrical shielding from stray fields and mechanical protection of the pressure elements are obtained.

Providing each pressure element with a sediment drain enables the process of electrical treatment to be performed in a particularly advantageous manner, since the sediments accruing in the individual chambers can be drained continuously for further processing.

BRIEF DESCRIPTION OF THE DRAWINGS

Several embodiments of the invention will now be described by way of example and with reference to the accompanying drawings in which:

FIG. 1 is a schematic top plan view of a device according to the invention, without positive electrodes and with integrally incorporated negative electrodes;

FIG. 2 is a side elevational view, partly in vertical section, of the device shown in FIG. 1, but with positive and negative electrodes;

FIG. 3 is a circuit diagram of the electrical control of the device;

FIG. 5 is a schematic side elevational view of a device according to a further embodiment of the invention, in which the cascade container is formed of pressure elements;

FIG. 6 is a top plan view of the device illustrated in FIG. 5;

FIG. 7 is a section on the line VII—VII of FIG. 5, and

FIG. 8 is a section through two adjacent pressure elements on the line VIII—VIII of FIG. 7.

DESCRIPTION OF THE PREFERRED EMBODIMENTS

Figure 4:
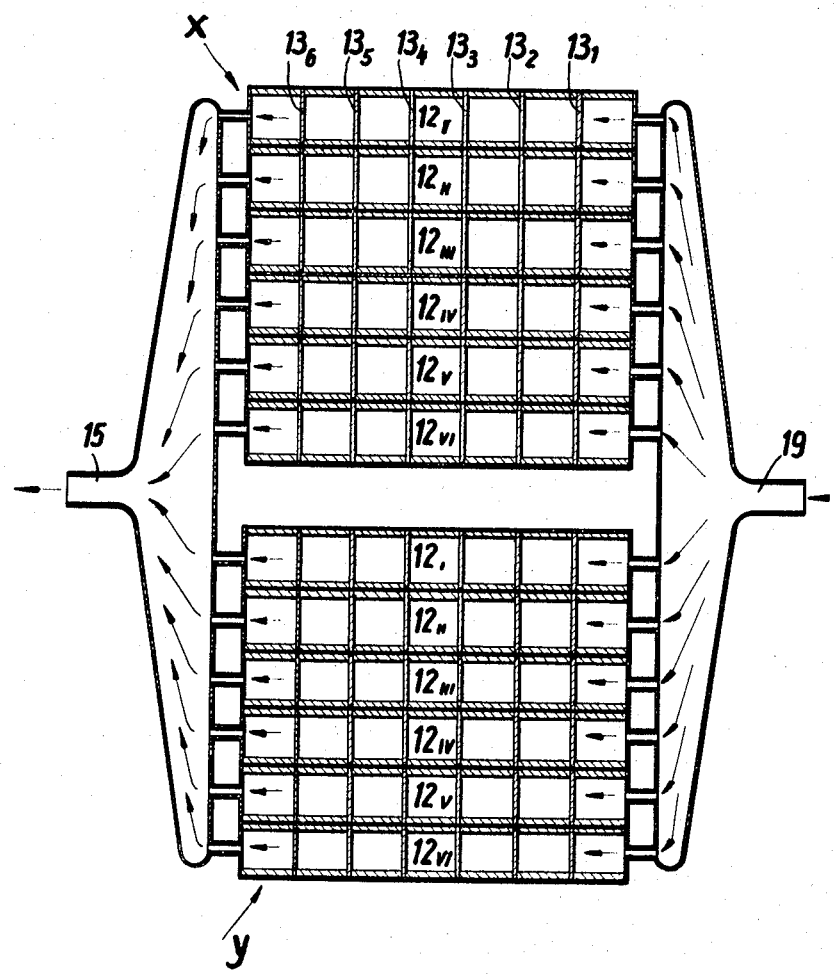
FIG. 4 is a view similar to FIG. 1, showing another embodiment of the invention, in which the device is formed of cascade container assemblies.

FIGS. 1 to 3 show a device according to the present invention which consists of a closed pressuretight cascade container 12 having an inlet 19 and an outlet 15 for the liquid to be treated, such as beer. An external induction coil 11 made of a plastic cylinder 11a with windings 11b of insulated copper wire is connected, on the one hand, to the inlet 19 and, on the other hand, to a liquid supply pipe 10. Internally, the cascade container 12 is provided with lower and upper cascade barriers, all made of carbon and forming negative carbon electrodes $13_1$ to $13_6$ and positive carbon electrodes $14_1$ to $14_5$, respectively.

From the supply pipe 10, the liquid to be treated will flow through the induction coil 11 and the inlet 19 into the cascade container 12, in which it will flow around the cascade barriers on a labyrinthic path, as indicated by the arrows A, before leaving the cascade container 12, after having been treated, through the outlet 15. The lower cascade barriers are secured to the bottom 12a of the cascade container 12, whereas the upper cascade barriers are mounted on the cover 12b of the cascade container 12 by means of insulators, e.g. sheds 16.

As shown in FIG. 2, the cascade container 12 is provided with insulated legs 18 standing on the ground designated by the reference numeral 17.

For the electrical control of the device the positive carbon electrodes $14_5$ and $14_4$, which are disposed next to the outlet 15 of the cascade container 12, as seen in the direction of flow of the liquid to be treated, can be connected to, and disconnected from, at least one first or high-potential capacitor C (FIG. 3) by means of a switch 20, preferably in the form of a gas-discharge tube. The positive carbon electrodes $14_3$, $14_2$, and $14_1$ disposed toward the inlet 19 of the cascade container 12 are each grounded via a second capacitor $C_3$, $C_2$, and $C_1$, respectively. The lower cascade barriers or negative carbon electrodes are grounded via a ground wire 21 and the windings 11b. Charging of the second capacitors $C_3$, $C_2$, and $C_1$ takes place through the liquid under treatment, which acts as an electrolyte, out of its residual voltage from the preceding discharge of the first or high-potential capacitor C, i.e. decaying in an e-function curve in the order of the second capacitors $C_3$, $C_2$, $C_1$.

In the foregoing, only one embodiment has been shown and described. It will be understood, therefore, that the carbon electrodes $13_1$ to $13_6$ and $14_1$ to $14_5$, as well as the first or high-potential capacitor C and the second capacitors $C_3$, $C_2$, and $C_1$ may vary in number as required in each case by the disperse systems to be treated, i.e. preferably beer, as well as other liquids, such as milk or the like beverages.

The electromagnetic charge on the liquid under treatment is influenced first in the induction coil 11 and the electric charge is subsequently influenced in the cascade container 12. The electromagnetic fields of the induction coil 11 build up and collapse impulsively in time with the discharge of the first or high-potential capacitor C. The same applies to the charging and discharging of the second capacitors $C_3$, $C_2$, and $C_1$. The combined magnetic and direct-current fields acting successively on the liquids under treatment cause the amphoteric parts of the liquid to take either an anionic or a cationic charge. This results in the formation of conglomerates in the liquid, which conglomerates can be eliminated by filters or centrifugal machines not shown in the drawings. At the same time, the micro-organisms are affected to such an extent, during the treatment of the liquid, as to disable them to propagate. This is due to the fact that unicellular and pluricellular micro-organisms, such as bacteria, need the the ion exchange for effecting the metabolism and their nutrient media (e.g. drugs, foodstuffs, stimulants etc.), i.e. between the nutrient medium and the interior of the organism (protoplasm). Such ion exchange is produced alternately by the charge of positive and negative carriers of electricity, i.e. anions and cations, which is created round the organism. Depending on the preponderance of either cations or anions, oppositely charged ions can enter the interior of the cell or leave it, respectively, This charge exchange, and thus the exchange of, for example, $Na^+$, $K^+$, $Ca^{++}$, $Mg^{++}$, etc., largely influences the whole metabolism of the micro-organisms and regulates effectively the intracellular metabolism. By treating the liquids as proposed by the invention, the micro-organisms contained therein are irreversibly polarized, with the result that their metabolism is stopped abruptly and their vitality is annihilated.

It is, however, also possible to perform the method of the invention in such a manner that instead of obtaining a pasteurization or sterilization by destroying the micro-organisms the contrary, namely a stimulation and propagation of the micro-organisms, e.g. bacteria and bacilli, is achieved advantageously with relatively low energy consumption, as is desired in the fermentation industry, for example, for the growth of yeast cultures.

In the modification shown in FIG. 4, the device comprises a plurality of cascade containers $12_I$, $12_{II}$, $12_{III}$, $12_{IV}$, $12_V$, $12_{VI}$, which are connected in parallel and/or in series to form one cascade container assembly X, Y..., respectively, In this case, it is also possible to provide a plurality of parallel and/or series-connected cascade container assemblies X, V. In the embodiment according to FIG. 4, two parallelly connected cascade container assemblies X, Y... are embodied.

As shown in FIG. 2, the cascade container 12 may have a degassing valve with an inspection window 22 located in the region of the outlet 15.

In the embodiment illustrated in FIGS. 5 through 8, the device for treating disperse systems comprises a cascade container 12 consisting of a plurality—at least three—of similar ring-shaped and electrically nonconducting pressure elements 23, an inlet end cover 24, and an outlet end cover 25. The pressure elements 23 are suspended on tie rods 29 by means of suspension hooks 28 located on opposite sides of the pressure elements 23. The tie rods 29 are connected by crosspieces 30 secured by means of lock nuts 41. A forcing spindle 31 with handwheel 32 is threadably engaged in each of the crosspieces 30, respectively for tightly pressing the pressure elements 23 together. The crosspieces are supported on legs 18.

An induction coil 11 consisting of a plastic cylinder 11a with windings 11b is connected between a supply pipe 10 for passing the liquid to be treated into the cascade container 12 through an inlet 19 via the inlet end cover 24. Inspection windows 33 and 34 may be incorporated in the supply pipe 10 and in an outlet 15, respectively.

The pressure elements 23 are made of plastics material, preferably polyethylene, which is indifferent to foodstuffs and luxuries or stimulants. As is shown in FIGS. 7 and 8, the pressure elements 23 are externally armored with a steel hoop 26. Each pressure element 23 is provided with a sediment drain 27.

Moreover, each pressure element 23 is provided with a cascade barrier in the form of a carbon electrode. As shown in FIGS. 5 and 6, the carbon electrodes are arranged so that negative electrodes $13_1$, $13_2$, $13_3$, $13_4$, $13_5$, and $13_6$ alternate with positive electrodes $14_1$, $14_2$, $14_3$, $14_4$, and $14_5$, which in their entirety are designated by the reference numerals 13 and 14 and which are connected to external electrode terminals 36 by means of a carbon stick 35 (FIG. 7). The electrode terminals 36 serve for connecting the wires from the capacitors $C$, $C_1$, $C_2$, $C_3$ or the ground wires, respectively.

For conveying the liquid under treatment, the individual pressure elements 23 are each provided with a milled inlet 37 and an opposite bye channel 38 joined by an annular channel 39 for conducting the liquid to a discharge opening 40 at the opposite end. The discharge opening 40 is connected to the milled inlet 37 of the following pressure element 23. As shown in FIG. 7, the pressure elements 23 may also be provided with two inlets 37 and, accordingly, with two discharge openings 40.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A process of pasteurizing and/or sterilizing and stabilizing beer containing dispersoids to coagulate said dispersoids and prevent the subsequent formation of dispersoids comprising steps of
   a. passing said beer through an induction coil while simultaneously subjecting it to strong electromagnetic pulses,
   b. then passing said beer between at least two electrodes while simultaneously subjecting it to an impulse-discharged direct-current field-induced by a pulsating discharge of a high-voltage capacitor to cause said beer to act as an electrolyte, and
   c. separating the coagulated material from the beer,
   d. said beer being maintained during said steps at about 25° C.
   e. whereby protein compounds are precipitated and turbidity of said beer is eliminated without affecting the color and flavor of the beer.

2. A process according to claim 1 wherein said separation step comprises filtering the coagulated material from the beer.

3. A process according to claim 1 wherein said separation step comprises removing said coagulated material from said beer by centrifugation.

4. A process according to claim 1 wherein said beer contains bacteria, said bacteria being rendered inactive by said process.

* * * * *